Oct. 31, 1933.  H. G. PONTING ET AL  1,932,421
CINEMATOGRAPHIC APPARATUS
Original Filed March 10, 1922   3 Sheets-Sheet 1
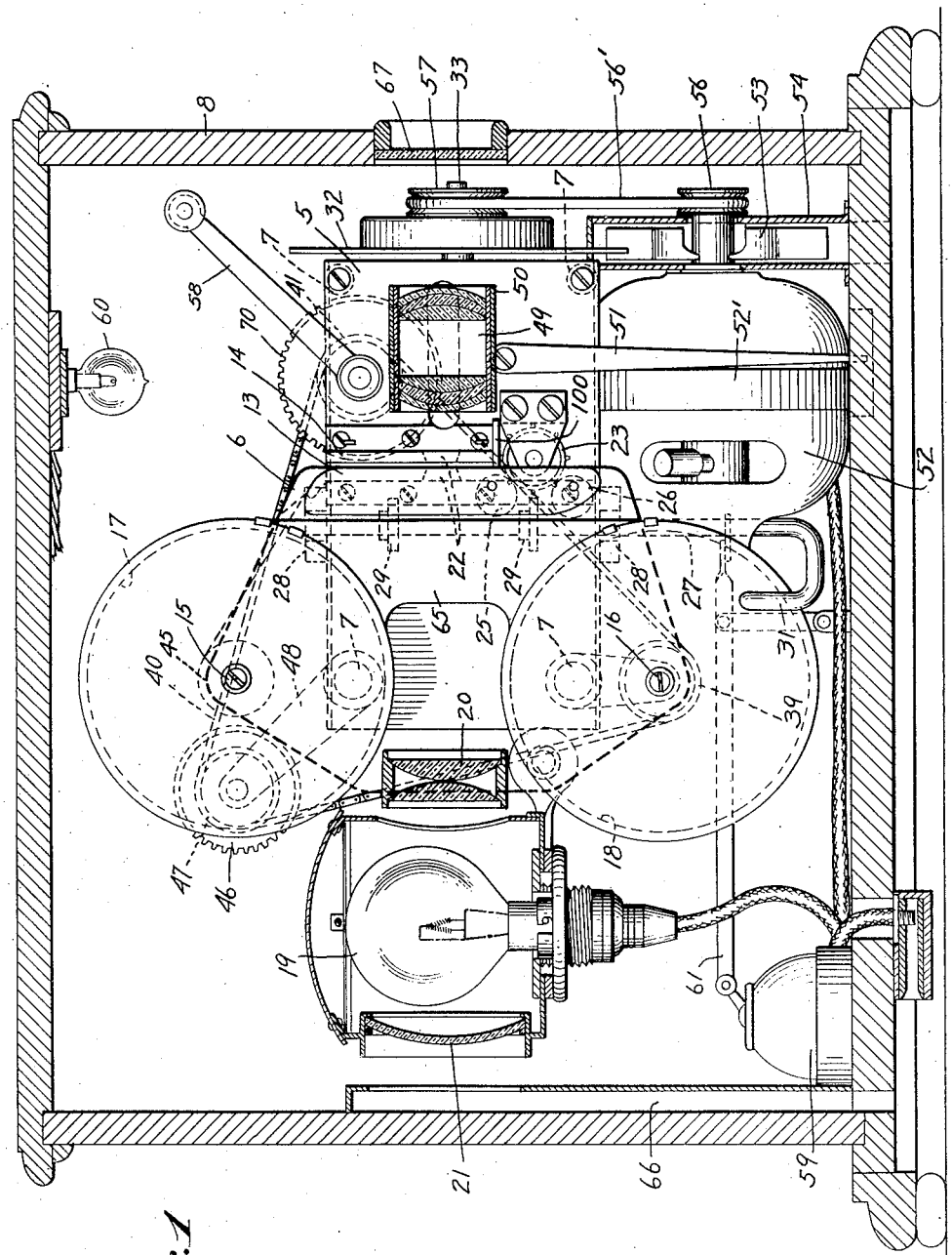
INVENTOR.
HERBERT G. PONTING.
GEORGE W. FORD.
BY Waldo G. Morse
ATTORNEYS.

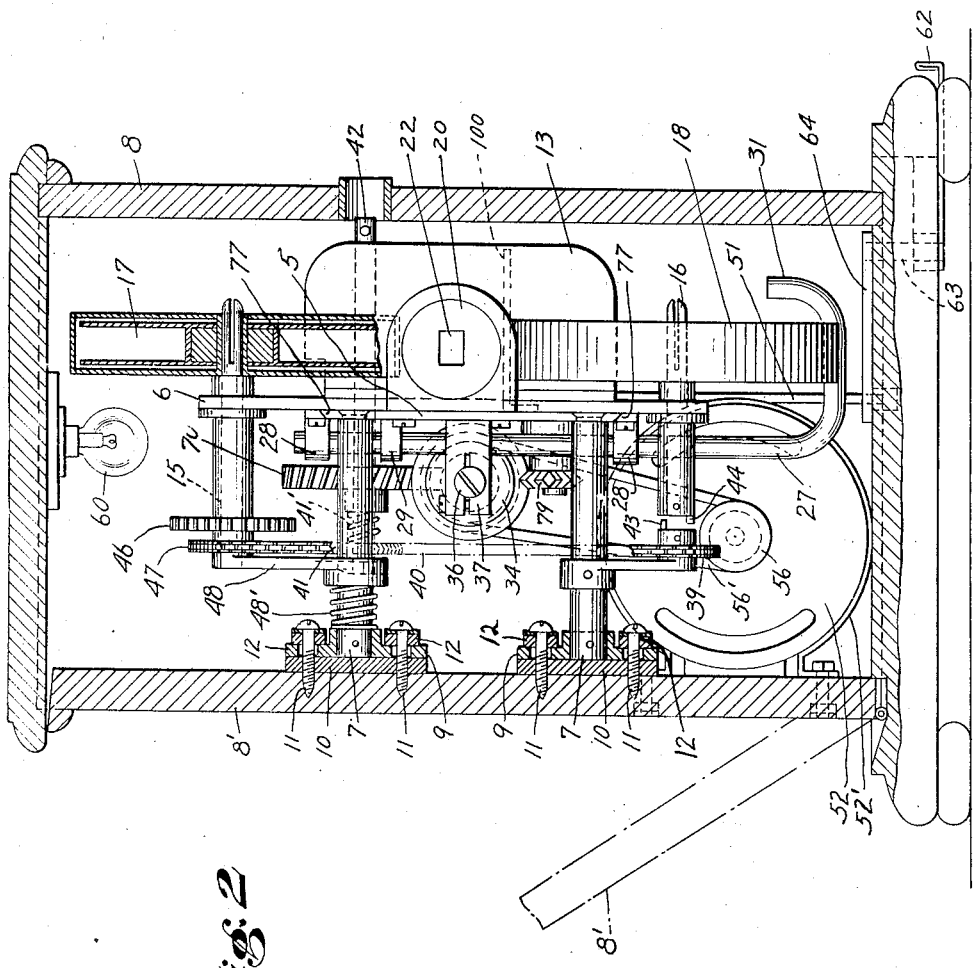

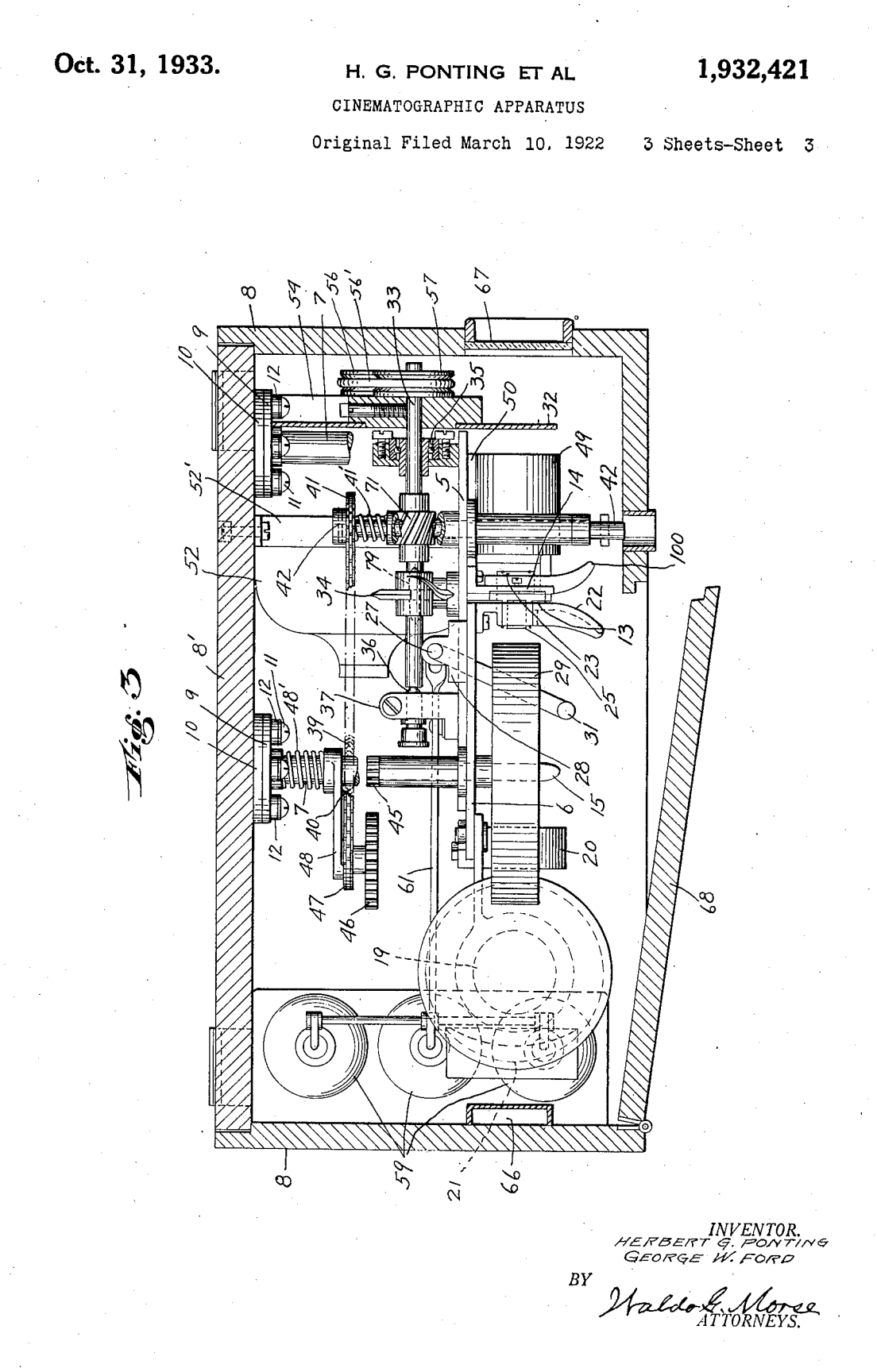

Patented Oct. 31, 1933

1,932,421

UNITED STATES PATENT OFFICE 1,932,421

CINEMATOGRAPHIC APPARATUS

Herbert George Ponting and George William Ford, London, England, assignors, by mesne assignments, to Kinatome Patents Corporation Original application March 10, 1922, Serial No. 542,898, and in Great Britain March 30, 1921. Divided and this application March 31, 1930. Serial No. 440,389

24 Claims. (Cl. 88—17)

This invention relates to film handling or cinematographic apparatus and in particular to such apparatus when constructed in portable form such as is suitable for domestic, as contrasted with public, cinematographic displays, or for the taking of cinematographic photographs.

The present invention provides cinematographic apparatus—that is projector or camera apparatus, in which the entire film handling mechanism is suspended within an outer protective casing or insulated therefrom in such manner that the transmission of vibration between such mechanism and casing is greatly reduced or prevented. The motor for driving such mechanism is preferably mounted upon the casing within the interior thereof but separately from such mechanism, driving connections between the motor and mechanism likewise being such as to preclude the transmission of vibration. The interlocked means controlling the actuation of the motor, feeding means, rewinding means, projection and pilot lights, and the gate, and the stripping, guiding and protecting members thereof, are likewise so constructed or arranged as to minimize or prevent the transmission of noise and other vibration and to reduce shock and jar.

By reason of such construction, it will be evident that noise or other vibration will not be transmitted from the film handling mechanism to the outside of the casing or from the outside of the casing to the film handling mechanism therewithin, and that noise or other vibration will not be transmitted between the driving motor and the moving parts in contact with the film or the film itself. Such elimination of noise and other vibration is of obvious and great advantage in either a projecting or a taking apparatus, designed either for ordinary cinematographic pictures or for images representing sound. Such construction also eliminates one chief cause of unsteady projection or photography by insulating the projecting or taking aperture of the gate against vibration from the motor as well as from the outer casing.

The source for the light which is passed through the film, its reflector and the condensing and objective lenses preferably are mounted integrally with the support for the apertured gate, such support being suspended by a vibration-damping construction from the interior of the casing. Thus relative movement between the optical train, or any part thereof, and the aperture, or between any two parts of the optical train, is prevented, and the transmission of vibration between the parts comprising the optical train and the aperture, or any of the same, and the casing or the motor is impeded or prevented. Also, in the preferred construction which is shown herein by way of illustration, the film supporting spindles and the film feeding mechanism are likewise mounted upon such insulated plate. The advantages of such construction or arrangement are obvious.

The foregoing and other features, objects and advantages of the invention will be more clearly understood from the following detailed description with reference to the accompanying drawings which illustrate one preferred construction of cinematographic apparatus according to this invention.

In these drawings:—

Figure 1 is a part-sectional side elevation of the apparatus;

Figure 2 is a part-sectional end elevation of the apparatus shown in Figure 1 looking towards the front of the machine;

Figure 3 is a part-sectional plan of the apparatus.

Like reference numerals indicate like parts throughout the drawings.

The main frame of the machine comprises two main plates 5 and 6 whereof one 5, herein termed the "fixed plate" is carried by pillars 7 secured to one wall of an enclosing cabinet 8 and the other of which, herein termed the "sliding plate" is slidably mounted upon the first. Between the feet 9 of the said pillars 7 and the wall 8' of the cabinet, rubber washers 10 are inserted for the sake of reducing noise and the feet are clamped upon these washers by screws 11 passing through other rubber washers 12 and clearing the holes in the feet. As is clearly shown in Figure 2, a metallic washer may be introduced between the heads of the screws 11 and the bushings 12, or the flanged heads of the screws 11 may hold the elements in place. It will be understood that such pillars 7 and feet 9 form supporting members or lugs by means of which, together with the screws 11 and insulating elements 10 and 12, the entire film handling mechanism is suspended from the wall of the cabinet. It will be readily understood that in place of rubber, any preferred sound damping material, or material which vibrates at a suitable rate, may be employed. That is, the molecular tension of the material forming the case and that forming the support and the elements carried thereby being relatively high, the molecular tension of the intermediate material should be relatively low in order to impede or prevent the passage of vibration.

The sliding plate 6 carries the rear portion 13 of the gate together with the two spindles 15 and 16 for the film spools 17 and 18, the projection lamp 19, the condenser 20, and a reflector 21, situated to the rear of the lamp. The rear portion 13 of the gate has three of its edges curved. The front half 14 of the gate projects from the fixed plate 5. The usual projection apertures 22 are provided. The disposition of the parts is therefore such that sliding movement of the one plate upon the other causes the gate to be opened and closed, and when open to give access to the gate along one edge which will hereinafter be called the mouth of the gate.

The film-sprocket 23 is carried on the fixed plate 5 just beyond the delivery end of the gate, and a film guiding and stripping nose piece 100 is provided projecting forwardly from the rear portion 13 of the gate and carried thereby so as to pass between the delivery end of the gate and the film sprocket 23.

The rear portion 13 of the gate is apertured to allow the film-sprocket 23 to project through it when the gate is closed, and above and below this aperture are mounted guide rollers 25 and 26 for the film which, when the gate is closed, cause the film to lap around part of the film sprocket periphery and so be drivingly engaged therewith.

The gate operating mechanism is in the form of a spindle 27 carried in bearings 28 on the sliding plate 6, one above and the other below the fixed plate 5 which carries the front portion of the gate and the said gate-opening spindle 27 carries two crank arms 29 which engage recesses in the said fixed plate 5. The bearing blocks 28 have undercut portions 77 (see Figure 2) which engage the top and bottom beveled edges of the fixed plate 5 which provide guides on which the plate 6 may slide. The lower end of the said spindle is bent to provide an operating handle 31.

The above described gate structure and the control thereof is set out in detail and claimed in our application, Serial Number 392,890 filed September 16, 1929, which upon November 19, 1929, matured as United States Letters Patent Number 1,736,730, said application being a division of our above mentioned parent application, Serial Number 542,898, filed in the United States Patent Office March 10, 1922.

To the rear of the fixed plate 5, that is to say, on that side which is remote from the gate, is mounted the step-by-step feed mechanism and the driving mechanism for the shutter. The shutter 32 is carried upon a spindle 33 which is carried at its forward end in a ball-bearing 35 and its rear end is received by a hollow centre formed eccentrically on a pin 36 that is rotatably mounted in a bracket 37 carried upon the fixed plate. Carried also on the spindle 33 is a spiral cam 34 which engages the sprocket or star wheel 79 fast on the film-driving sprocket spindle. The cam 34 is so shaped that a step-by-step or intermittent rotation is imparted to the film-driving sprocket as will be readily understood by reference to the drawings.

The two film spool spindles 15 and 16 project through the sliding plate 6 and the "take-up" spindle 16 is provided with a clutch serving to connect and disconnect it with a driving sprocket 39 operated by an endless chain 40 passing over a sprocket 41 loosely mounted on the main driving spindle 42 and driven through the spring 41' in the manner later described. The clutch referred to is constituted by a single pin 43 projecting from the end of the spindle 16 parallel to the axis of rotation of the latter and serving to engage with an oppositely directed pin 44 projecting from the chain sprocket 39.

The paying-out film spool spindle 15 carries at one end a pinion 45 which, in the closed position of the gate is entirely free but which, when the gate is opened is brought into engagement with a driving spur wheel 46, carried upon a chain sprocket 47 over which the aforesaid endless chain 40 passes. This latter chain sprocket and spur wheel are mounted on an arm 48 which arm is loosely mounted upon the upper rear pillar 7 and controlled by the spring 48' which is coiled about the pillar 7 with one end fixed to the arm 48 and the other fixed to the pillar and hence capable of a limited movement of rotation about an axis parallel to that of the spool spindles.

The objective lens 49 is carried on the fixed plate 5 forward of the gate, being mounted in a bracket 50 that is slidable in said plate under the control of a lever 51 extending downwardly from the plate towards the base of the instrument.

The whole projector is enclosed within the case or cabinet 8 and near the bottom of the cabinet is mounted an electric motor 52 which is attached to the hinged plate 8' by the strap 52' for driving the projector and, if desired, serving also to ventilate the cabinet. The latter function may be provided for by means of a fan 53 on an extension of the armature spindle of the motor enclosed in a housing 54 attached to the motor and movable therewith having an opening at its bottom communicating through an opening in the bottom of the cabinet with the outer air. On the armature spindle is a driving pulley 56 connected by a belt 56' with a pulley 57 on the front end of the shutter spindle 33 which drives the spindle 42 through the skew gears 70 and 71. The sprocket 41 is yieldingly driven by gear 70 through the spring 41'.

An operating handle 58 (shown in position in Figure 1) is provided primarily for rewinding purposes, and is adapted to engage the free end of the cross spindle 42 carrying the chain sprocket 41.

In the base of the cabinet are mounted three switches 59, namely, the motor switch, the lamp switch, and a switch for a small pilot lamp 60 provided inside the cabinet. The operating spindle 27 for the gate is connected with these three switches by a link 61, so that the operation of opening the gate automatically breaks the motor and projection lamp circuit and closes the pilot lamp circuit and the closing of the gate reverses these operations.

Outside the base of the cabinet a lever 62 is provided connected by a short spindle 63 to a corresponding lever 64 on the inside, slotted to receive the tail of the lever 51 above referred to as connected with the objective lens 49. Such slotted connection seems to reduce the transmission of vibration. The pillars 7 carrying the main frame of the machine are secured to one of the walls 8' of the cabinet as previously described and this latter is hinged, conveniently about its lower end so that the whole machine can be swung out from within the cabinet upon its supporting wall for inspection and adjustment. Conveniently the two film spool cases are mounted together with a connecting bridge 65 to constitute a single unit carrying the film so that the film spools are never taken out of the cases when once mounted therein. Such connecting bridge of the magazine may be rigid, in accordance with United States Letters Patent Number 1,100,591, granted June 16, 1914, to Ferdinand Von Madaler, or hinged, in accordance with our patent application Serial Number 494,772, filed in the United States Patent Office August 24, 1921, which application upon December 26, 1922, matured as United States Letters Patent Number 1,440,173, or any other desired type of magazine or open reel may be employed. It will be understood that the transmission of vibration of any character between the film so enclosed or supported and the motor or between such film and the outside of the case is prevented by the above described construction.

To operate the machine a pair of spool cases with their enclosed film are slipped upon the free ends of the spool spindles 15 and 16, the gate having been previously opened by means of the operating handle 31. This operation has interrupted the motor circuit and lamp circuit and has closed the circuit to the pilot lamp. As the spools are slipped on their spindles the film passes readily into the gate and proper relation to the sprocket 23. The gate is then closed and the approach of the rear portion 13 towards the front 14 causes the guide rollers 25 and 26 for the film to press the latter closely around the periphery of the sprocket 23 as the latter enters and passes through the co-operating aperture in the rear portion of the gate. At the same time the "take-up" spool spindle 16 is brought into position to be clutched by the chain sprocket 39 for driving it and the three switches 59 in the base are operated as above described. The linkage between the gate-operating handle and the switches is such as to provide the necessary lost motion to enable the required snap action of the switches, such construction also serving to reduce the transmission of vibration. Any required adjustment of the objective lens 49 for focusing purposes is carried out by means of the lever 62 in the base of the cabinet, the proportions of the levers being such as to afford a fine adjustment.

When the film has been run through, the gate may be opened and the movement of the sliding plate 6 thereby declutches the "take-up" spindle 16 from its driving sprocket 39 and throws the pinion 45 on the 'paying-out" spindle 15 into engagement with the spur wheel 46 for rotating it and thus rewinding the film. Owing to the yielding control of the arm 48 carrying the spur wheel 46, engagement with the pinion 45 on the "paying-out" spindle is effected without difficulty or damage.

The rewinding of the film can be effected by the handle 58, or, if desired, a subsidiary switch may be provided to close the motor circuit again after it has been opened automatically by the gate-operating lever.

If ventilation is desired, the fan 53 may serve to expel air from the cabinet through the opening in the base and an inlet for the air may be provided which is at the rear of the projection lamp 19 through a duct 66 communicating with an opening in the base of the cabinet. If such construction is employed, no light, therefore, will escape either through the inlet or the outlet for air and the discharge of the inlet duct being arranged in close proximity to the lamp ensures sufficient cooling.

As is clearly shown in Figures 1 and 3, the case may be provided with a projection opening enclosed with glass 67, or other transparent body, for the purpose of still further insulating the mechanism and the outside of the case. As is clearly shown in Figure 3, an operating door 68 is likewise provided.

Many of the advantages of our invention are stated in or apparent from the foregoing portion of this specification or from the subjoined claims. Other advantages include the provision of a construction which precludes the passage of noise or other unwanted vibration between the film and the exterior of the case or between the film and the driving motor.

Certain of the elements of our invention, described herein, are claimed in our parent and divisional applications, to which reference hereinbefore has been made.

Having now particularly described and ascertained the nature of our said invention and in what manner the same is to be performed, we declare that what we claim is:—

1. In a motion picture apparatus, an enclosing casing, a support, film handling means on said support, means for mounting said support within said casing, and vibration damping means associated with said mounting means for preventing the transmission of noise between said casing and said support.

2. In a film handling apparatus, an enclosing casing, a supporting plate, film engaging mechanism positioned upon said plate, and means extending between said plate and said casing for mounting said plate therewithin, said means including a connecting member, material of definite noise-reducing characteristics, and means for maintaining said member in abutment with said material.

3. In a film handling apparatus, in combination a film-gate constructed in two separate portions a front portion and a rear portion, a fixed support for one of said portions, a movable support for the other said portion, a casing enclosing said apparatus, pillars on said fixed support attached to said casing, and non-resonant material between said pillars and said casing to insulate said pillars therefrom for the purpose of reducing noise.

4. In a film handling apparatus, in combination a film-gate constructed in two separate portions a front portion and a rear portion, a fixed support for one of said portions, a movable support for the other said portion, film-spools on said movable support, a casing enclosing said apparatus, pillars on said fixed support attached to said casing and non-resonant material between said pillars and said casing to insulate said pillars therefrom for the purpose of reducing noise.

5. In a film handling apparatus, in combination an enclosing casing, a film-gate, mechanism for feeding a film therethrough, and means for mounting said gate upon said casing therewithin whereby the transmission of vibration therebetween is limited, said means including a support to which said gate is attached, a supporting connection between said support and said casing, and vibration-damping material positioned between said casing and said support at all points of connection therebetween and between said supporting connection and said support, said supporting connection and said support being so formed and positioned as to be free of direct engagement, whereby said enclosing casing, said support and said supporting connection are maintained free of direct vibration-transmitting contact.

6. In a film handling apparatus, an enclosing casing, said casing embodying a support, a separate support, a film-engaging member mounted upon said separate support, and means for mounting said separate support within said casing for limiting the transmission of vibration between said casing and said film-engaging member, said means including vibration-damping material positioned between said supports, said supports being so formed and disposed that they are free of direct contact, a connection between said supports for maintaining said supports in effective relation to said material and to each other, vibration damping material positioned between one of said supports and said connection, and said last previously above mentioned support and said connection being so formed and disposed that they are free of direct contact, whereby the transmission of vibration between said two supports is impeded.

7. In a film handling apparatus, the combination of an enclosing case, film feeding mechanism operatively mounted in said case, means in said case for driving said mechanism, a frame upon which the parts of said mechanism are mounted, and resilient supporting connections between the frame and the case to prevent transmission of vibration.

8. In a film handling apparatus, in combination, an enclosing casing, a film support, means for feeding a film in relation to said support, a motor for driving said feeding means, said motor being mounted upon said casing and said feeding means being fixedly disposed in relation thereto and means for mounting said support within said casing whereby the transmission of vibration between the film upon said support and said motor is impeded, said means including a connection between said support and said casing which includes a section of vibration damping material.

9. In a film handling apparatus, two supports, film handling mechanism including a film engaging member, said member being mounted upon one of said supports, a motor for operating said mechanism, said motor being mounted upon the other of said supports, and means extending from one of said supports to the other whereby one is mounted upon the other, said means including a connecting member, material of definite noise-reducing characteristics, and means for maintaining said connecting member in abutment with said material whereby the transmission of noise between said member and said motor is impeded.

10. In a film handling apparatus, the combination of an enclosing case, film feeding mechanism operatively mounted in said case, means in said case for driving said mechanism, a frame upon which the parts of said mechanism are mounted, and supporting connections between the frame and the case to prevent transmission of vibration, said connections comprising vibration damping material, the frame and the case being so formed and positioned as to be free of direct contact, and members for holding the frame and case in effective relation to such material, said frame, case and each of said holding members being so formed and disposed that none of said members forms contact with both the frame and the case or with another of said members thereby transmitting vibration between the frame and the case.

11. In a film handling apparatus, two supports, film handling mechanism including a film engaging member, said member being mounted upon one of said supports, a motor for operating said mechanism, said motor being mounted upon the other of said supports, and means for mounting one of said supports upon the other whereby the transmission of vibration therebetween is limited, said means including vibration damping material disposed between said supports, said supports being so formed and disposed as to be free of direct contact, a supporting connection for holding said supports in effective relation to said material and to each other, vibration damping material positioned between said supporting connection and one of said supports, and said last previously mentioned support and said supporting connection being so formed and disposed that said supporting connection and said last previously mentioned support are free of engagement, whereby at all points said supports and said connection are maintained free of direct vibration-transmitting contact one with any of the others.

12. In a film handling apparatus in combination, an enclosing casing, a film containing magazine, a structure disposed within said casing upon which said magazine may be removably mounted, and non-resonant material so disposed in relation to said structure and said casing that while said magazine is mounted upon said structure said material is positioned between said casing and the film within said magazine for the purpose of reducing the transmission of vibration therebetween.

13. In a film handling apparatus, the combination of an enclosing case, a film supporting member, a support for said member, film feeding mechanism operatively mounted in said case for feeding a film supported by said member in relation thereto, means mounted upon said case for driving said mechanism, and supporting connections between said support and the portion of the case upon which said driving means is located to prevent transmission of vibration between said driving means and a film mounted upon said film support, said connections comprising vibration damping material, said support and said case being so formed and positioned as to be free of direct contact, and members for holding the support and case in operative relation to such material, said support, case and each of said holding members being so formed and disposed that none of said members forms contact with both the support and the case or with another of said members thereby transmitting vibration between the support and the case.

14. In a film handling apparatus, a casing, an apertured gate disposed therewithin, means for feeding a film therethrough, a lens cooperating with the film at the aperture of said gate, a support upon which said lens is mounted, and means extending between said support and said casing for mounting said support upon said casing, said means including vibration damping material and means to maintain said support in abutment therewith whereby the passage of vibration between said casing and said lens is impeded.

15. In a film handling apparatus including an apertured gate and means for feeding a film through said gate, an enclosing casing, said casing embodying a support, said apertured gate being disposed within said casing, a lens cooperating with the film at the aperture of said gate, a support, separate from the support embodied in said casing, upon which said lens is mounted, and means extending between said supports for mounting said lens within said casing for limiting the transmission of vibration between said casing and said lens, said means including vibration damping material positioned between said supports, said supports being so formed and disposed that they are free of direct contact, a connection for maintaining said supports in effective relation to said material and each other, vibration damping material positioned between one of said supports and said connection, and said last previously mentioned support and said connection being so formed and disposed that they are free of direct contact, whereby the transmission of vibration between said two supports is impeded.

16. In a film handling apparatus, a casing, an apertured gate disposed therewithin, means for feeding a film therethrough, a source of light cooperating with the film at the aperture of said gate, a support upon which said source of light is mounted, and means extending between said support and said casing for mounting said support upon said casing, said means including a section of vibration damping material whereby the passage of vibration between said casing and said source of light is impeded.

17. In a film handling apparatus, including an apertured gate and means for feeding a film through said gate, an enclosing casing, said casing embodying a support, said apertured gate being disposed within said casing, a source of light cooperating with the film at the aperture of said gate, a support separate from the support embodied in said casing, upon which said source of light is mounted, and means extending between said supports for mounting said source of light within said casing for limiting the transmission of vibration between said casing and said source of light, said means including vibration damping material positioned between said supports, said supports being so formed and disposed that they are free of direct contact, a connection for maintaining said supports in effective relation to said material and each other, vibration damping material positioned between one of said supports and said connection, and said last previously mentioned support and said connection being so formed and disposed that they are free of direct contact, whereby the transmission of vibration between said two supports is impeded.

18. In a film handling apparatus, in combination film feeding mechanism, a frame for supporting said mechanism, a casing enclosing said mechanism and said frame, and means for mounting said frame upon said casing whereby the transmission of vibration between said casing and said frame is impeded, said means including a lug, an opening through said lug, a member, adapted to pass through said opening, for attaching said lug to said casing, the dimensions of said opening and into the casing being greater than the corresponding dimensions of said member whereby said member and said lug are free of direct contact, a shoulder upon said member, vibration damping material between said shoulder and one side of said lug, and vibration damping material between said member and the opposite side of said lug.

19. In a film handling apparatus, in combination film feeding mechanism, a support for said mechanism, a casing enclosing said mechanism and said support, and means for mounting said support upon said casing whereby the transmission of vibration between said casing and said support is limited, said means comprising a lug, an opening through said lug, a member, adapted to pass through said opening and into the casing, for attaching said lug to said casing, the dimensions of said opening being greater than the corresponding dimensions of said member whereby said member and said lug are free of direct contact, a flange upon said member, vibration damping material between said lug and said casing, and vibration damping material between said flange and said lug.

20. In a film handling apparatus, in combination film feeding mechanism, a plate to which said mechanism is fixed, a support, and means for mounting said plate whereby the transmission of vibration between said support and said plate is limited, said means comprising a lug, an opening through said lug, a member, adapted to pass through said opening and into the support, for attaching said lug to said support, the dimensions of said opening being greater than the corresponding dimensions of said member whereby said member and said lug are free of direct contact, a flange upon said member, vibration damping material between said lug and said support, and vibration damping material between said flange and said lug.

21. In a film handling apparatus, the combination of a case, film-feeding mechanism operatively mounted in the case, means in said case for driving said mechanism, a frame in which the parts of said mechanism are mounted provided with lugs at one side thereof, and resilient supporting connections between the frame and the case to prevent transmission of vibration, comprising vibration absorbing material positioned upon one side of each of said lugs, vibration absorbing material positioned upon the other side of each of said lugs, and metallic members secured to the case and extending through said material whereby said lugs are mounted upon said case, said lugs and said members being so formed and disposed as to be free of direct contact with each other.

22. A motion picture machine including an enclosing casing with an opening at one side, a supporting frame, means for removably seating said frame upon said casing, said frame comprising plates secured together in spaced parallelism, by connections which include vibration damping material whereby the transmission of vibration between said plates is impeded, and having one of said plates extending vertically above and below the other of said plates and, when said frame is seated upon said casing, having said second mentioned plate disposed in a part of said casing interior to said opening, a pair of revoluble film spools removably carried by the frame on transverse axes and disposed in vertically spaced edgewise relation outwardly thereof, means for feeding a film in a path to one side of the frame, and gearing carried by said frame between the plates thereof for driving said feeding means and one of the film spools.

23. A motion picture machine including an enclosing casing with an opening at one side, a supporting frame, means for removably seating said frame upon said casing, said frame comprising two plates secured together in spaced parallelism by connections which include vibration damping material whereby the transmission of vibration between said plates is impeded and having one of said plates extending vertically above and below the other of said plates and, when said frame is seated upon said casing, having said second mentioned plate disposed in a part of said casing interior to said opening, a pair of revoluble film spools removably carried by one of said plates on transverse axes projecting away from the side of said plate relatively distant from said other mentioned plate and said axes being disposed in vertically spaced parallel relation to each other, means for feeding a film between said spools in a path outwardly of the frame, and gearing carried by said frame between the plates thereof for driving said feeding means and at least one of the film spools, and a motor carried by the other of said plates.

24. Film handling apparatus including an enclosing casing with an opening at one side, a supporting frame, means for removably seating said frame upon said casing, said frame comprising two plates secured together in spaced parallelism by connections which include vibration damping means whereby the transmission of vibration from one of said plates to the other is impeded, said frame being so constructed that one of said plates, when said frame is seated upon said casing, closes said opening and the other of said plates is disposed inwardly of said opening within the enclosure of said casing, and operating mechanism, said mechanism including a motor, a film moving member, and gearing for transmitting power from said motor to said member, said motor being mounted upon one of said plates for bodily movement therewith and, when said frame is seated upon said casing, being disposed inwardly of said opening within the enclosure of said casing, and said member being mounted upon the other of said plates for bodily movement therewith and, when said frame is seated upon said casing, being disposed inwardly of said opening within the enclosure of said casing.

HERBERT GEORGE PONTING. [L. S.]
GEORGE WILLIAM FORD. [L. S.]